INVENTOR.
OTTO R. NEMETH
BY
Elliott & Pastoriza
ATTORNEYS

United States Patent Office 3,351,253
Patented Nov. 7, 1967

3,351,253
RESILIENT COUPLING FOR FLYWHEEL FILM DRIVE
Otto R. Nemeth, Los Angeles, Calif., assignor, by mesne assignments, to Photo Electronics Corporation, Los Angeles, Calif., a corporation of California
Filed Sept. 13, 1965, Ser. No. 486,628
5 Claims. (Cl. 226—13)

ABSTRACT OF THE DISCLOSURE

This disclosure relates to a structure for sound motion picture projectors to improve constant film speed movement past the sound head during initial starting of the projector. Towards this end a flywheel is initially brought up to a speed by the drive motor for the projector slightly less than the normal film speed. Simultaneously with the bringing up of the flywheel speed to this lessened value, a sprocket drive is driven by the motor to move the film there being provided a resilient or compliance means in the sprocket structure such that there is a lag time between the positive driving of the film by the sprocket structure and the driving of a portion of the sprocket structure by the motor. It is during this small delay time period that the flywheel is brought up to approximate speed. As the film reaches its normal speed, it takes over the driving of the flywheel, the latter being disengaged from direct driving by the motor. As a result, the constant speed of the film past the sound head is assured substantially throughout the transient period of starting the projector.

---

This invention generally relates to sound recording and reproducing apparatus and more particularly concerns improvements associated with said apparatus for more properly controlling the tensioning and velocity of movement of the film or tape passing therethrough.

The present invention will be described from the standpoint of the film used in conjunction with a motion picture sound projector; however, it will be appreciated that the invention may equally well be applied to sound tape recorders or sound reproducing apparatus in which a tape moves from a supply or feed reel to a take-up reel or the equivalent thereof.

Thus, in this regard, where the term "film" is used throughout this application, it should be understood that the term "tape" may be substituted therefor and towards this end the term "film" is deemed to be the equivalent of the term "tape" and vice versa.

The present invention, however, may be most advantageously employed in conjunction with sound motion picture projectors in which an intermittent motion of the film necessarily occurs as the film passes the shutter and aperture wherein projection of the film occurs, and in which thereafter the film must have a constant speed as it passes the sound head.

In conventional motion picture projectors, the problem of converting the intermittent movement of the film to a constant movement as it passes the sound head is achieved by employing loops in conjunction with idler rollers or mechanical filters interposed between the point at which the film passes the aperture and the point at which it moves proximate the sound head. It is also the usual practice to include a flywheel which serves to smooth out the various discrepancies in the rate of movement of various parts of the projector and associated film.

One of the problems associated with conventional motion picture sound projectors is that as the projector starts up inertia of the flywheel is such that it does not immediately attain a rotational velocity equal to the proper film speed. In consequence, in sound projectors a "whining" noise occurs or accompanies the initial starting up of the projector.

Various efforts have been made to avoid this problem in the prior art; however, most of the approaches have been relatively complex and involve expensive, cumbersome systems. For example, one approach has been to monitor the length of the loop that is used in the projector to in turn effect regulation of a variable speed assembly associated with the flywheel. However, such an arrangement varies the load on the projector motor and may, as well as being complex, adversely affect the entire device.

Other problems associated with conventional sound motion picture projectors relate to changes in line voltage or other conditions which result in slight variations in the motor drive or chain drive speed. These changes in speed may adversely affect the film tension or affect the proper viewing of the film.

A primary object of the present invention, therefore, is to provide an improvement associated with the film feeding and driving mechanism of a sound projector that will eliminate to a substantial degree the lag time between the flywheel attaining its proper rate of speed resulting from the inertia thereof and which will, at the same time, prevent any sudden shock being imposed upon the film or any tension transmitted thereto which might be injurious to the film or to the various parts of the projector.

Another object of the present invention is to provide improvements associated with the film feeding and driving mechanism which will tend to equalize out and compensate for any conditions varying the rate of film speed such as changes in line voltage and variations in drive belt or drive chain linkages, or the like.

A still further object of the present invention is to provide an improved film feeding and driving mechanism wherein the mechanical filtering action achieved through the use of idler rollers and loops is eliminated and is, instead, incorporated in an improved film driving sprocket which not only embodies means for pulling the film to the take-up reel, but also incorporates means for filtering out differentials in film speed.

These and other objects and advantages are generally achieved by providing in a sound reproducing apparatus an improved film feeding and driving system wherein an overriding ratchet clutch means is employed to bring the flywheel up to approximately the proper speed by a drive directly from the motor rather than through the medium of the film as such, such overriding means being disengaged at the time the flywheel achieves a velocity just below its normal operating speed. In a further improvement associated with the present invention, resilient coupling means are employed in the drive associated with the film sprocket to compensate for the differential in speed between the film sprocket and flywheel drive through "elastic" or resilient means embodied in the film sprocket drive.

A better understanding of the present invention will be had by reference to the drawings disclosing merely one illustrative embodiment of the invention, and in which.

Figure 1:
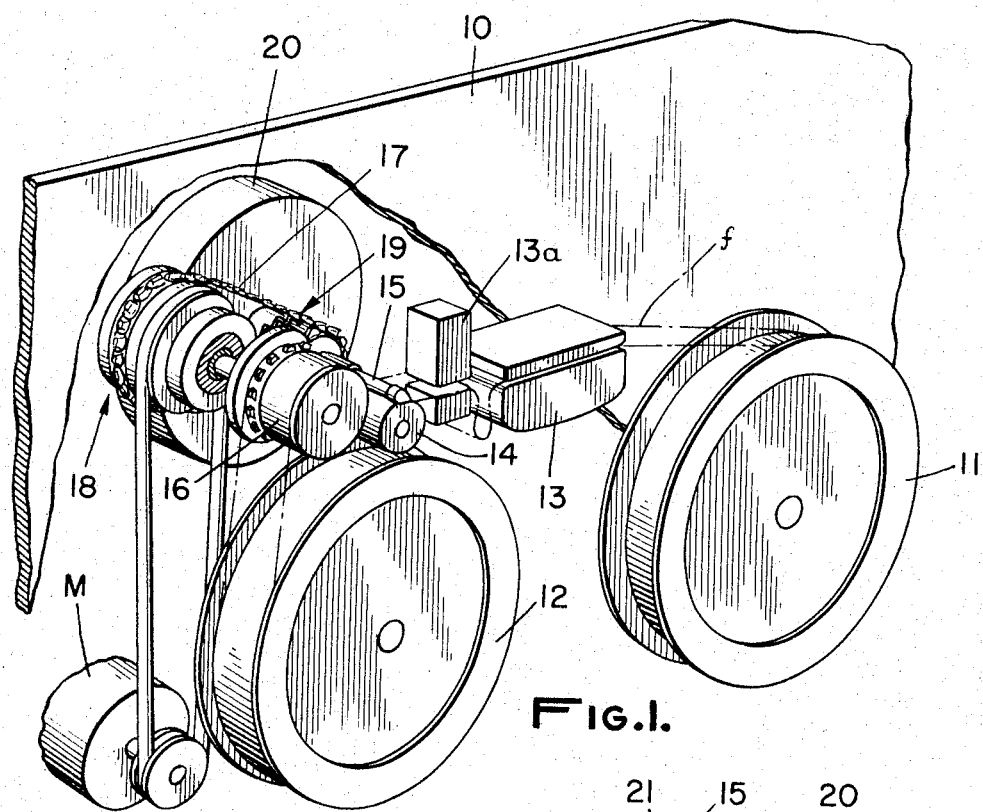
FIGURE 1 is a perspective, partially schematic representation of a part of a sound motion picture projector illustrating the components with which the present invention is associated.

Referring now to the drawings, there is shown in FIGURE 1 a portion of a sound motion picture projector including a mounting or supporting plate 10. Coupled to the supporting plate 10 is a supply or feed reel 11 designed to provide film to be fed to the reel 12 past a film gate 13. An appropriate lens and lamp system would also, of course, be incorporated in the projector, although not shown, since these components form no part of the present invention and may be of any conventional type.

After the film passes through the film gate past the aperture 13, it must subsequently proceed through a sound head 13a. It will be appreciated that the film in passing through the film gate will have an intermittent motion while at the time it passes through the sound head 13a its movement must be constant. In consequence, a loop is provided as indicated therebetween.

Once the film has passed through the sound head 13a, the film passes between a pressure roller 14 and flywheel shaft 15 (the pressure roller 14 being shown disposed apart from the shaft 15, although in operation, the pressure roller would be biased against the shaft 15 with the film interposed therebetween). Thereafter, the film passes over the film sprocket 16 to the take-up reel 12.

A motor M is provided on the projector as schematically indicated in FIGURE 1 and has coupled thereto a drive chain 17 which in turn is coupled to a spring compliance associated with the film sprocket 16 and to a ratchet clutch mechanism 19 associated with the flywheel shaft 15. The flywheel shaft 15 has connected to it on the other side of the supporting plate 10 a flywheel 20.

Figure 2:
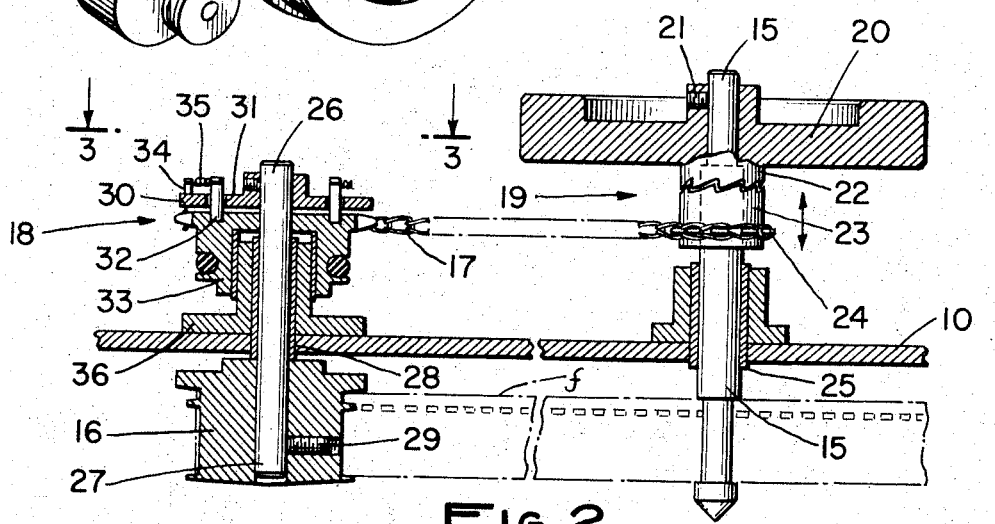
FIGURE 2 is a sectional view of the flywheel mechanism and the associated film sprocket drive towards which the present invention is directed.

The construction of the flywheel 20, clutch mechanism 19, and associated shaft 15, as well as the construction of the film sprocket 16 and associated spring compliance 18, will be more clearly understood by reference to FIGURE 2.

Referring now to FIGURE 2, there is shown the flywheel 20 rigidly secured, as with a screw 21, to the rear end of the shaft 15 on the back side of the supporting plate 10. The ratchet clutch 19 associated with the flywheel 20 includes a flywheel ratchet structure 22 either rigidly affixed to or forming a part of the flywheel 20. The ratchet 22 is designed to co-function with a movable ratchet 23, the latter being free to rotate on the shaft 15. In the position shown in FIGURE 2, ratchet 22 is in engagement with ratchet 23 such that movement of the driving chain 17 will cause the flywheel 20 and flywheel shaft 15 to rotate. Engagement between the ratchets 22 and 23 may be effected by gravity, or by a spring biasing member (not shown), if the disposition of flywheel ratchet clutch 19 is such that gravity will not urge the movable ratchet 23 towards the flywheel ratchet 22. As indicated, a sprocket is provided on the ratchet 23 to enable the latter to be driven by the drive chain 17. The shaft 15 may be suitably journalled at 25 within the supporting plate 10.

As indicated in FIGURE 2, the drive chain 17 is also coupled to the film sprocket 16 and more particularly the spring compliance means 18 thereof. The film sprocket 16 has a shaft 26 including a portion 27 thereof retaining the sprocket 16. The shaft 26 is journalled within a bearing 28 of the supporting plate 10 and is secured to the sprocket 16 with a screw 29.

Figure 3:
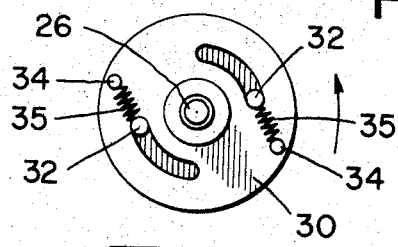
FIGURE 3 is a view taken in the direction of the arrows 3—3 of FIGURE 2 showing a bottom plan view of the film sprocket drive illustrating the resilient means employed therewith.

At its other end, the shaft 26 has securely connected thereto a disc-like member 30, more clearly seen in the view of FIGURE 3. The disc member 30 defines arcuate openings 31 into which project pins 32 extending from another disc 33. Disc member 30 has rigidly secured thereto posts 34. Springs 35 are attached to the posts and also are attached to the pins 32. In consequence, the disc member 30 may rotate relative to the disc 33 to a limited extent determined by the length of the arcuate openings 31 and against the biasing force of the springs 35.

The disc member 33 is journalled in a bearing member 36 so that it, like the ratchet 23, may rotate relative to the shaft 26 with which it is associated.

The operation of the improved film driving and feeding means, according to the present invention, may now be described. At the time that the motor is turned on to rotate the drive chain 17, the ratchet 23 will be in engagement with the ratchet 22 so that the flywheel 20 and the shaft 15 thereof will immediately commence rotational movement. Furthermore, movement of the drive chain 17 will cause movement of the disc member 33 and associated pins 32 and, in turn, cause movement of the disc 30 subject to the "elastic" connection therebetween in the form of springs 35. The spring compliance 18, is of course designed such that the springs are sufficiently strong to cause the disc 30 to be rotating before the pins 32 reach the ends of the arcuate openings 31.

The drive chain's connection to the ratchet 23 is such as to cause the flywheel to rotate at a speed approximately five percent less than the normal speed of the film sprocket. This difference would normally be harmful on the film; however, since the film sprocket 16 is driven through the spring compliance 18, there is sufficient give or resiliency to correct for the speed differential between the flywheel speed and the film sprocket speed.

As the film speed comes up to the normal rate, the ratchet 22 will override the ratchet 23 and the flywheel will move at the same linear film speed as the film sprocket 16. Thus, the film sprocket will take over the drive of the flywheel independently of the ratchet means 19.

From the foregoing, it will be apparent that the improved film feeding and driving mechanism of the present invention provides a much simplified approach towards bringing the flywheel up to speed in a minimum amount of time and at the same time eliminating any unusual tension being placed on the film, either during start up or running of the projector. The present invention also provides an improved film sprocket construction eliminating the need for separate mechanical filtering means. Other advantages and objects of the present invention have also been made apparent from the foregoing.

Although one embodiment of the invention has been shown in application to a sound motion picture projector, it will be appreciated that many modifications may be made both in the structure employed and the application in which the invention is embodied. Such modifications are believed to fall within the spirit and scope of the claims hereinafter set forth.

What is claimed is:

1. In a sound reproducing apparatus including a motor and having a film fed from a feed reel to a take-up reel, the combination comprising: a mounting plate; a flywheel shaft extending through and journaled in said mounting plate, said flywheel shaft having one portion on the back side and another portion on the front side of said plate; a flywheel mounted on said one portion; said film engaging said other portion to drive said flywheel; pressure roller means mounted on said plate on said front side and shiftable from a position enabling threading of said film to a position wherein it urges said film against said other portion of said flywheel shaft; film sprocket means coupled to said mounting plate for driving said film; drive means coupled to said motor and coupled to said film sprocket means; resilient means associated with said film sprocket means such that initial movement of the portion of said film sprocket means coupled to said drive means does not cause immediate movement of the film; and ratchet means associated with said flywheel and coupled to said drive means, said ratchet means being designed to drive said flywheel means to a given speed less than the normal film speed, and said ratchet means being designed to be overriden as said flywheel exceeds said given speed as said film reaches said normal speed.

2. In a sound reproducing apparatus, including a motor and having a film fed from a feed reel to a take-up reel, the combination comprising; flywheel means designed to be driven by said film; ratchet means associated with said flywheel means, said ratchet means being coupled for driving with said motor, and said ratchet means being designed to drive said flywheel independently of said film to a speed just lower than the normal film speed, said ratchet means being further designed such that when said film is moving at its normal speed the ratchet means will be disengaged; a film sprocket provided on said projector and coupled to be driven by said motor, and in which said film sprocket includes spring compliance means interposed therein, said spring compliance means enabling the motor coupled to said film sprocket to effect limited relative rotation of that part of said film sprocket coupled to said motor prior to motion being imparted to said film, whereby compensation is made for any change in movement of film as a result of the differential between said flywheel speed and said film spocket speed.

3. In a sound motion picture projector, including a motor and having a film fed from a feed reel to a take-up reel, the combination comprising: flywheel means associated with said motion picture projector, said flywheel means including ratchet means coupled for driving by said motor, said ratchet means including a free wheeling portion designed to engage another portion locked to said flywheel and to disengage in response to the flywheel reaching normal film speed, said free wheeling portion being coupled to said motor; film sprocket means associated with said projector and including one portion relatively movable with respect to another portion thereof and resilient means interposed therebetween, said one portion being connected to said motor to be driven thereby and said another portion being designed to drive said film, whereby said flywheel may be driven to a given speed by said motor independently of said film sprocket and whereby said ratchet means may be disengaged by the film and flywheel being brought to their normal speed by said film sprocket, and yet in which film tensioning does not occur because of said resilient means embodied in said film sprocket.

4. The combination, according to claim 3, in which said resilient means in said film sprocket comprises one disc coupled for driving by said motor, another disc adapted to drive the film sprocket, and spring means rotatively coupling said one disc to said another disc whereby a differential speed between said ratchet means of said flywheel and said film sprocket will not cause adverse tensioning to the film.

5. The combination, according to claim 4, and means limiting relative rotation between said discs.

References Cited

UNITED STATES PATENTS

| | | | |
|---|---|---|---|
| 1,802,065 | 4/1931 | Poulsen | 226—13 |
| 2,022,492 | 11/1935 | Clay | 226—61 X |
| 2,098,215 | 11/1937 | Black | 226—13 |

M. HENSON WOOD, JR., *Primary Examiner.*

R. A. SCHACHER, *Assistant Examiner.*